US011506961B2

(12) United States Patent
Lin et al.

(10) Patent No.: US 11,506,961 B2
(45) Date of Patent: Nov. 22, 2022

(54) HEAT DISSIPATION MODULE AND PROJECTION APPARATUS USING THE SAME

(71) Applicant: Coretronic Corporation, Hsin-Chu (TW)

(72) Inventors: Shi-Wen Lin, Hsin-Chu (TW); Wei-Chi Liu, Hsin-Chu (TW); Tsung-Ching Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/069,884

(22) Filed: Oct. 14, 2020

(65) Prior Publication Data

US 2021/0116794 A1 Apr. 22, 2021

(30) Foreign Application Priority Data

Oct. 22, 2019 (CN) .......................... 201911004791.4

(51) Int. Cl.
*G03B 21/16* (2006.01)
*G03B 21/20* (2006.01)

(52) U.S. Cl.
CPC ......... *G03B 21/16* (2013.01); *G03B 21/2053* (2013.01)

(58) Field of Classification Search
CPC .. G03B 21/16; G03B 21/2053; G02B 6/4269; G02B 6/3814; G02B 6/4273
See application file for complete search history.

(56) References Cited

U.S. PATENT DOCUMENTS

| 7,215,545 | B1* | 5/2007 | Moghaddam | ....... H01L 23/3732 165/185 |
| 10,062,826 | B2* | 8/2018 | Casey | ..................... H01L 35/30 |
| 10,111,362 | B2* | 10/2018 | Tsai | ..................... H05K 7/20272 |
| 2005/0201107 | A1* | 9/2005 | Seki | ..................... H04N 9/3105 362/373 |
| 2007/0165190 | A1 | 7/2007 | Takagi | |
| 2010/0282444 | A1* | 11/2010 | Lin | ..................... F28D 15/0275 165/185 |
| 2011/0073292 | A1* | 3/2011 | Datta | ..................... F28F 1/40 165/157 |

(Continued)

FOREIGN PATENT DOCUMENTS

| CN | 2556788 Y | 6/2003 |
| CN | 2664051 Y | 12/2004 |

(Continued)

*Primary Examiner* — Magda Cruz

(57) ABSTRACT

A heat dissipation module includes a base, a cover and a plurality of heat dissipation fins. The cover is disposed on the base and forms an accommodation space with the base. The plurality of heat dissipation fins is disposed in the accommodation space. The cover includes a top, at least one side wall, a first opening and a second opening. The first opening and the second opening are disposed on the top or the at least one side wall. The at least one side wall surrounds the top and is connected to the base. The distances between the plurality of heat dissipation fins and one of the at least one side wall in a first direction are different. A projection apparatus is also provided, which includes a light source module, a light valve, the aforementioned heat dissipation module and a projection lens.

15 Claims, 14 Drawing Sheets

(56) References Cited

U.S. PATENT DOCUMENTS

| | | | |
|---|---|---|---|
| 2011/0103060 A1* | 5/2011 | Wang | F21V 29/745 362/249.02 |
| 2011/0249444 A1* | 10/2011 | Hayashi | F21V 29/80 362/294 |
| 2017/0045307 A1* | 2/2017 | Tsai | H01L 23/473 |
| 2017/0097196 A1* | 4/2017 | Yoo | F28F 3/04 |
| 2018/0270456 A1* | 9/2018 | Ueda | G03B 21/16 |
| 2019/0360764 A1* | 11/2019 | Liu | F28F 3/06 |
| 2019/0364694 A1* | 11/2019 | Lin | H01L 23/473 |
| 2020/0310234 A1* | 10/2020 | Liu | G03B 21/16 |

FOREIGN PATENT DOCUMENTS

| | | | |
|---|---|---|---|
| CN | 2817316 Y | 9/2006 | |
| CN | 100456913 C | 1/2009 | |
| CN | 103874395 A | 6/2014 | |
| CN | 104218011 A | 12/2014 | |
| CN | 104378951 A | 2/2015 | |
| CN | 106716004 A | 5/2017 | |
| CN | 206674407 U * | 11/2017 | G03B 21/16 |
| CN | 208270917 U | 12/2018 | |
| CN | 208459759 U | 2/2019 | |
| CN | 210864308 U | 6/2020 | |
| DE | 202004018218 U1 | 1/2005 | |
| TW | M246981 U | 10/2004 | |

\* cited by examiner

HEAT DISSIPATION MODULE AND PROJECTION APPARATUS USING THE SAME

CROSS-REFERENCE TO RELATED APPLICATION

This application claims the priority benefit of China application (CN201911004791.4), filed on Oct. 22, 2019. The entirety of the above-mentioned patent application is hereby incorporated by reference herein and made a part of this specification.

FIELD OF THE INVENTION

The invention relates to a heat dissipation module, and more particularly to a heat dissipation module for a projection apparatus and to a projection apparatus using the heat dissipation module.

BACKGROUND OF THE INVENTION

Since the market demand for the life and brightness of the projector gradually increases, the light sources used by the projector tend to have longer life and higher brightness. However, a problem of heat concentration also occurs due to the high light emitting power of light sources. Therefore, the projector is required to have a better capability of heat dissipation. The known cooling method with a fan can no longer meet the cooling requirements of high-power projectors. Although the water cooling method provides another option, the actual use effect is lower than expected, so that the problem of overheating of the projector needs to be solved urgently.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a heat dissipation module, which has better heat exchange efficiency and can speed up heat extraction, thereby maintaining a proper temperature of the device.

The invention provides a projection apparatus, which has better temperature adjustment function, better working performance and longer service life.

Other advantages and objects of the invention may be further illustrated by the technical features broadly embodied and described as follows.

In order to achieve one or a portion of or all of the objects or other objects, the heat dissipation module provided by the invention includes a base, a cover and a plurality of heat dissipation fins. The cover is disposed on the base and forms an accommodation space with the base. The plurality of heat dissipation fins is disposed in the accommodation space. The cover includes a top, at least one side wall, a first opening and a second opening. The first opening and the second opening are disposed on the top or the at least one side wall. The at least one side wall surrounds the top and is connected to the base. The distances between the plurality of heat dissipation fins and one of the at least one side wall in a first direction are different.

In order to achieve one or a portion of or all of the objects or other objects, the projection apparatus provided by the invention includes a light source module, a light valve, the aforementioned heat dissipation module and a projection lens. The light source module is used to provide an illumination beam. The light valve is located on a transmission path of the illumination beam and is used to convert the illumination beam into an image beam. The heat dissipation module is disposed adjacent to at least one of the light source module and the light valve. The projection lens is located on a transmission path of the image beam and is used to project the image beam.

In the heat dissipation module of the invention, the distances between the heat dissipation fins and the at least one side wall in the first direction are different, therefore, the cooling fluid in the heat dissipation module can fully contact the heat dissipation fins. In addition, the distribution form of the heat dissipation fins can change the flow resistance of the cooling fluid or adjust the flow direction of the cooling fluid, thereby improving the heat dissipation efficiency of the heat dissipation fins, which helps to improve the heat exchange efficiency of the heat dissipation module and speed up the heat extraction. The projection apparatus of the invention includes the heat dissipation module, which has better heat dissipation efficiency and can effectively prevent overheating, thereby having better work performance and a longer service life.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
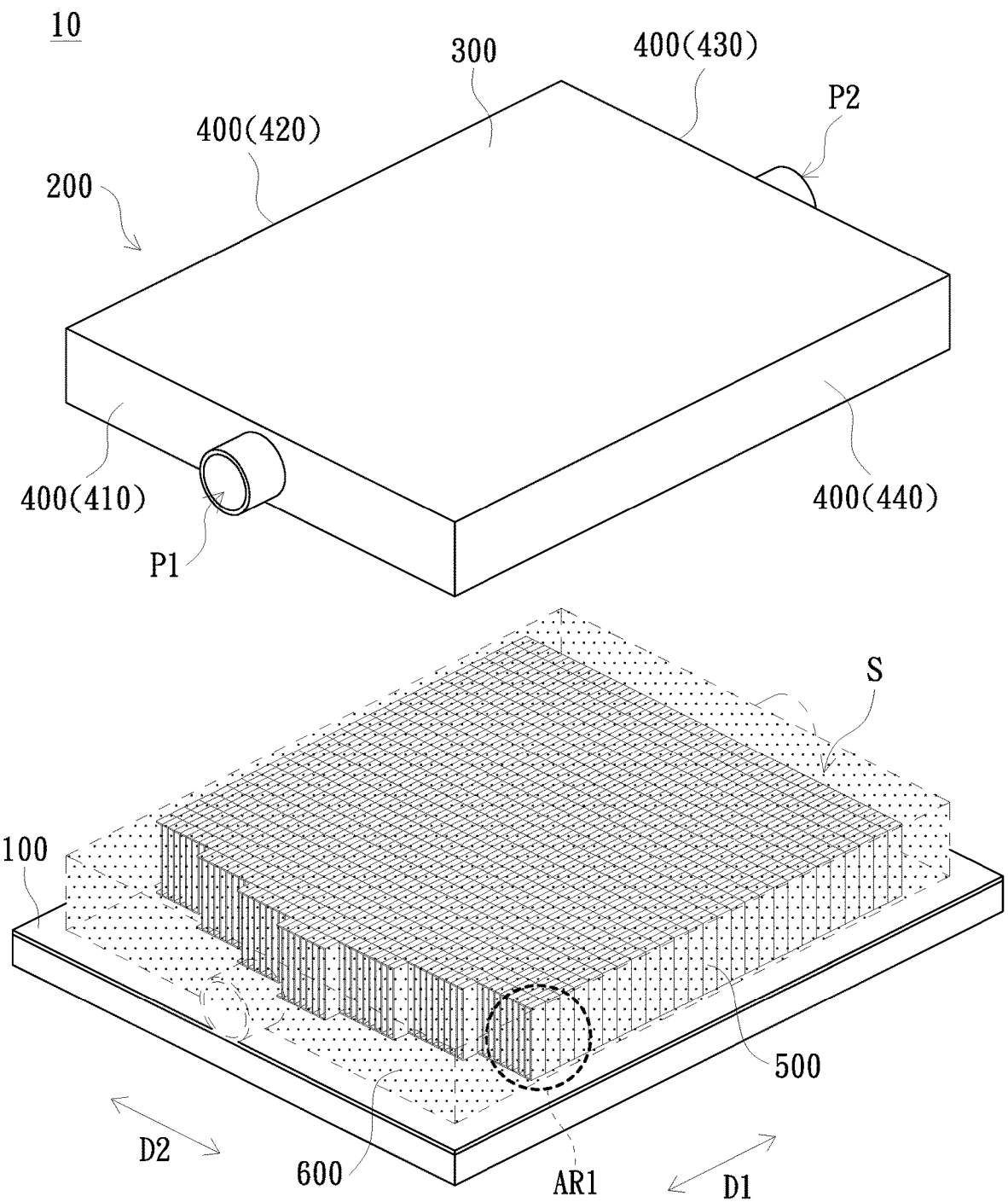
FIG. 1A is a schematic partially exploded view of a heat dissipation module according to an embodiment of the invention.
Figure 1B:
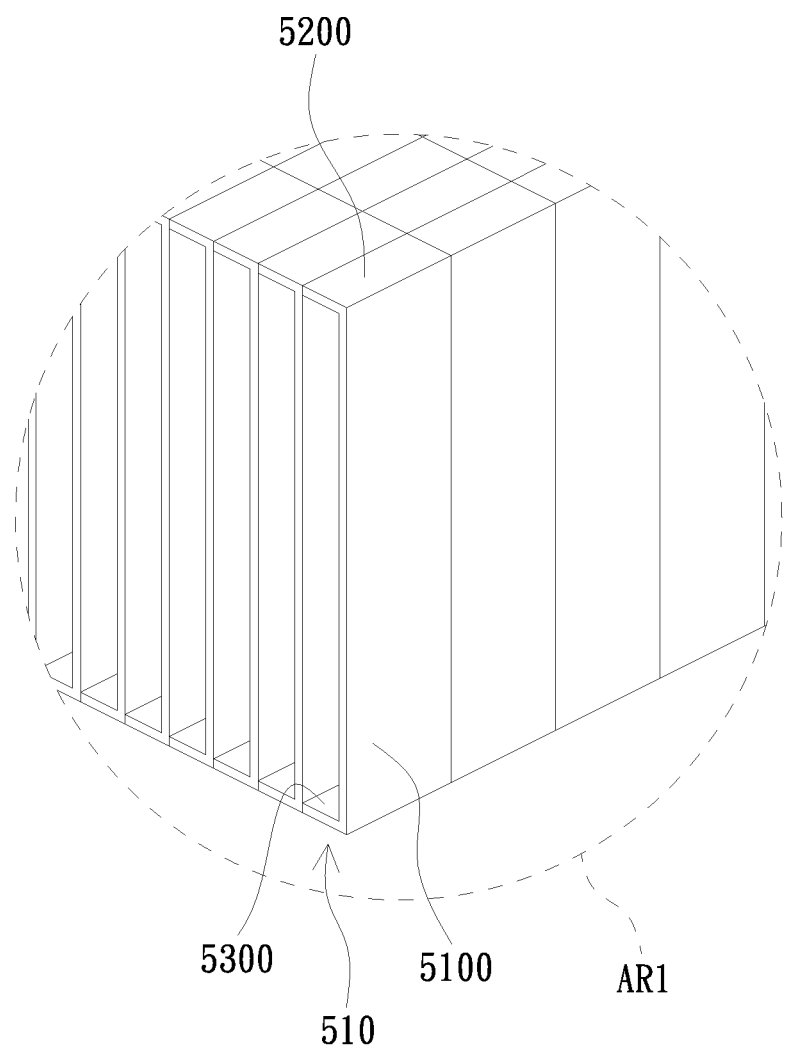
FIG. 1B is a schematic enlarged view of the circle AR1 in FIG. 1A.
Figure 2:
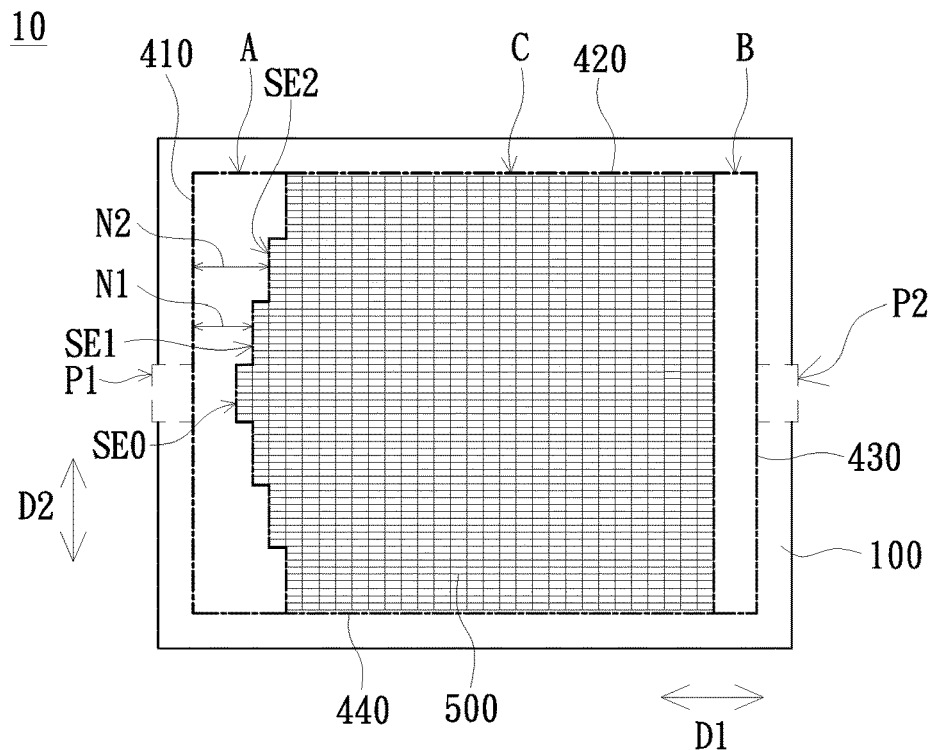
FIG. 2 is a schematic partial top view of the heat dissipation module of the embodiment shown in FIG. 1A.

FIG. 1A is a schematic partially exploded view of a heat dissipation module according to an embodiment of the invention. FIG. 1B is a schematic enlarged view of the circle AR1 in FIG. 1A. FIG. 2 is a schematic partial top view of the heat dissipation module of the embodiment shown in FIG. 1A. As shown in FIGS. 1A, 1B and 2, the heat dissipation module 10 includes a base 100, a cover 200 and a plurality of heat dissipation fins 500. The cover 200 is disposed on the base 100 and constitutes an accommodation space S with the base 100. The heat dissipation fins 500 are disposed in the accommodation space S and located between the base 100 and the cover 200. The heat dissipation module 10 may be disposed adjacent to or connected to a heat source of a device to help the heat source of the device to dissipate heat. The device may be, for example, a projection apparatus, and the heat source of the device may be, for example, a light source or a light valve, but the invention is not limited thereto. In some embodiments, the material of the base 100 may include a metal with better thermal conductivity.

In some embodiments, the cover 200 includes a top 300, at least one side wall 400, a first opening P1 and a second opening P2. The first opening P1 and the second opening P2 may be disposed on the top 300 (not shown) or on the at least one side wall 400. The at least one side wall 400 surrounds the top 300 and is connected to the base 100. The cover 200 of the embodiment includes a plurality of side walls 400, and the distances between the heat dissipation fins 500 and one of the side walls 400 are different. Specifically, each of the heat dissipation fins 500 may extend substantially in the first direction D1 in the accommodation space S, and the plurality of the heat dissipation fins 500 may extend parallel to each other and be disposed at intervals in the second direction D2. The second direction D2 is perpendicular to the first direction D1. In the embodiment, the distances between the heat dissipation fins 500 and one of the side walls 400 (e.g., the side wall 410) in the first direction D1 are different, but not limited thereto. The heat dissipation fins 500 are spaced from each other and constitute a plurality of flow channels (not shown in FIG. 1A) extending in the first direction D1.

In the embodiment, each of the heat dissipation fins 500 is a sheet-shaped fin, but is not limited thereto. Each of the heat dissipation fins 500 may also be an offset strip fin (OSF) or a columnar fin. As shown in FIGS. 1A and 1B, each heat dissipation fin 500 may be formed by a plurality of fin units 510. The fin unit 510 may include a body portion 5100, a first bending portion 5200 and a second bending portion 5300 that are bent relative to the body portion 5100. The first bent portion 5200 and the second bent portion 5300 are respectively located at opposite ends of the body portion 5100 and face each other. The first bending portion 5200 and the second bending portion 5300 are bent relative to the body portion 5100 about 90 degrees. The body portion 5100, the first bending portion 5200 and the second bending portion 5300 of one fin unit 510 are respectively aligned with the body portion 5100, the first bending portion 5200 and the second bending portion 5300 of the adjacent fin unit 510, so that the heat dissipation fins 500 extending in the first direction D1 are formed.

In some embodiments as shown in FIGS. 1A to 2, the side walls 400 may include a first side wall 400 (410), a second side wall 400 (420), a third side wall 400 (430) and a fourth side wall 400 (440) sequentially connected end to end. The first side wall 410 and the third side wall 430 are located on opposite sides of the heat dissipation fins 500, respectively. In the embodiment shown in FIG. 1A, the first side wall 410 and the third side wall 430 extend in the second direction D2 and are parallel to each other. The distances between the heat dissipation fins 500 and the first side wall 410 in the first direction D1 are different, but not limited thereto. For example, the distances between the heat dissipation fins 500 and the third side wall 430 in the first direction D1 may be different.

In the embodiment, the first opening P1 is disposed on the first side wall 410 and the second opening P2 is disposed on the third side wall 430. It should be noted that although the first opening P1 and/or the second opening P2 are disposed on the side wall in the embodiment, the positions of the first opening P1 and the second opening P2 are merely used to illustrate the embodiment, but not to limit the invention. In other embodiments of the invention, at least one of the first opening P1 and the second opening P2 may be disposed on the top 300 of the cover 200.

As shown in FIG. 2, the distances between the heat dissipation fins 500 and the first side wall 410 in the first direction D1 are different. For example, the distances N1 and N2 are different. In the embodiment, the heat dissipation fins 500 in the first direction D1 may have a plurality of starting points (e.g., starting points SE0, SE1 and SE2) adjacent to the first side wall 410 and a plurality of ending points (not labeled in FIG. 2) adjacent to the third side wall 430. The distances between the starting points and the first side wall 410 may gradually change according to the relative position of each starting point. Specifically, the starting points of the heat dissipation fins 500 include a starting point SE0 closest to the first opening P1 and other starting points respectively located on both sides of the starting point SE0. For example, the starting point SE1 is closer to the starting point SE0 than the starting point SE2 in the second direction D2, and the starting point SE1 is closer to the first side wall 410 than the starting point SE2 in the first direction D1. That is, the distance N1 is less than the distance N2. In some embodiments, the heat dissipation module 10 may further include a cooling fluid 600 (labeled in FIG. 1A). The first opening P1 may serve as an inlet and the second opening P2 may serve as an outlet. The cooling fluid 600 enters the accommodation space S of the heat dissipation module 10 through the first opening P1, passes through the flow channels formed by the heat dissipation fins 500 in the accommodation space S, and then flows away from the heat dissipation module 10 through the second opening P2, so that heat exchange and heat dissipation are performed.

In some embodiments as shown in FIG. 2, the accommodation space S may include a first buffer zone A, a second buffer zone B and a heat exchange zone C located between the first buffer zone A and the second buffer zone B. The heat dissipation fins 500 are distributed in the heat exchange zone C. Alternatively, the heat dissipation fins 500 constitute the heat exchange zone C. The first buffer zone A and the second buffer zone B are adjacent to the first opening P1 and the second opening P2, respectively. In the embodiment, the first buffer zone A is located on the side of the heat dissipation fins 500 adjacent to the first side wall 410, and the second buffer zone B is located on the side of the heat dissipation fins 500 adjacent to the third side wall 430, but are not limited thereto. Specifically, the first buffer zone A may be surrounded by at least the first side wall 410 and the heat dissipation fins 500, and the second buffer zone B may be surrounded by at least the heat dissipation fins 500 and the third side wall 430. In the embodiment as shown in FIG. 2, the first buffer zone A may be surrounded by the first side wall 410, a portion of the second side wall 420, the heat dissipation fins 500 and a portion of the fourth side wall 440, and the second buffer zone B may be surrounded by the third side wall 430, a portion of the fourth side wall 440, the heat dissipation fins 500 and a portion of the second side wall 420. In the embodiment shown in FIG. 2, the second buffer zone B is rectangular.

In some embodiments, as described above, the distances between the starting points of the heat dissipation fins 500 and the first side wall 410 may gradually change according to the relative position of each of the starting points. For example, relative to the starting point SE0, the other starting points (e.g., starting points SE1 and SE2) may be arranged in a step. That is, among the starting points, the starting point farther away from the starting point SE0 has the larger distance from the first side wall 410. Therefore, the shape of the heat exchange zone C formed by the heat dissipation fins 500 on a side adjacent to the first side wall 410 may protrude toward the first opening P1 at a position corresponding to the first opening P1.

In the embodiment shown in FIGS. 1A to 2, the first opening P1 may be located at a center position of the first side wall 410. In this case, the first opening P1 may be located corresponding to the center line of the first side wall 410. The starting point SE0 of the heat dissipation fins 500 is located corresponding to the first opening P1. In addition, as described above, the starting point SE0 is closest to the first side wall 410, compared to other starting points SE1 and SE2. The side starting points SE1 and SE2 are gradually arranged away from the starting point SE0 in the second direction D2, and the intervals between the first side wall 410 and the starting points SE1 and SE2 are gradually larger in the first direction D1. In this case, the side of the heat exchange zone C adjacent to the first side wall 410 may protrude toward the first opening P1, and the side of the first buffer zone A adjacent to the heat exchange zone C may be recessed relative to the heat exchange zone C. The edges of the first buffer zone A and the heat exchange zone C may be stepped at the position where the first buffer zone A and the heat exchange zone C are connected.

Figure 3A:
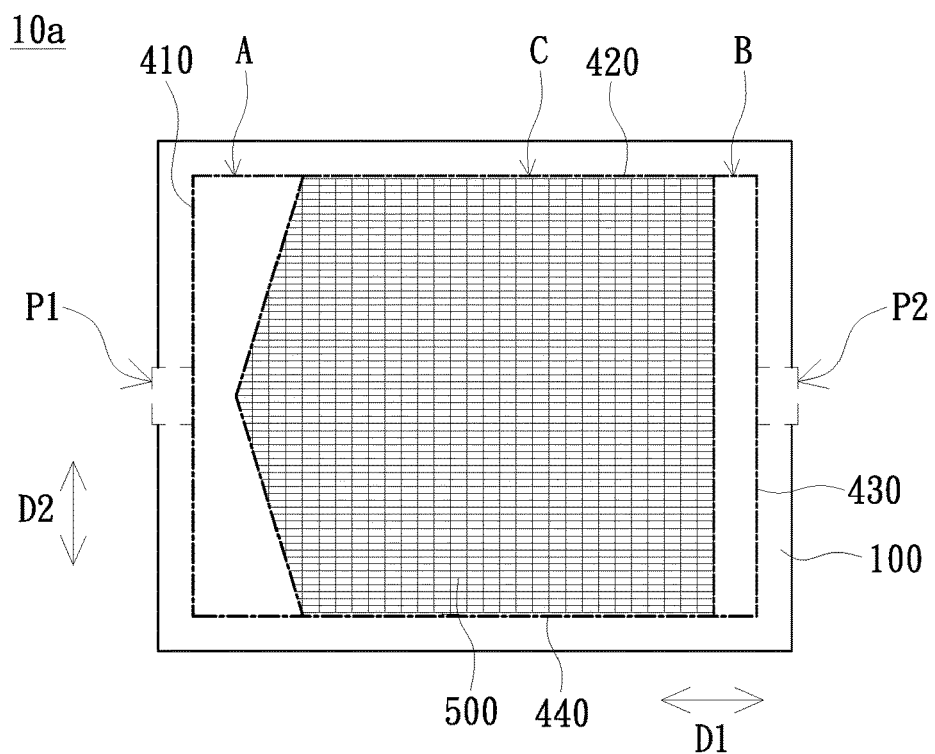
FIGS. 3A to 3C are schematic partial top views of a heat dissipation module according to other embodiments of the invention.
Figure 3B:
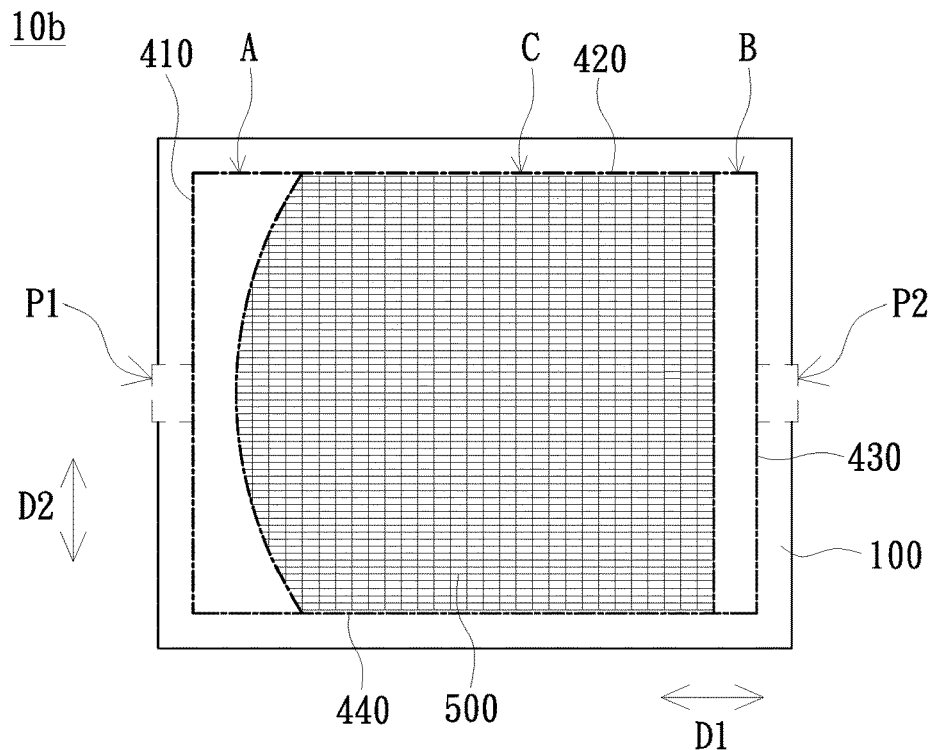

In some embodiments, the edge of the first buffer zone A or the heat exchange zone C is not limited to a step shape. In the embodiment shown in FIG. 3A, the side of the heat exchange zone C of the heat dissipation module 10a adjacent to the first side wall 410 can protrude toward the first opening P1 and the edge thereof is smooth, and the side of the first buffer zone A adjacent to heat exchange zone C may be recessed relative to the heat exchange zone C and the edge thereof is smooth. The first buffer zone A may be a concave pentagon. In the embodiment shown in FIG. 3B, the side of the heat exchange zone C of the heat dissipation module 10b adjacent to the first side wall 410 can protrude toward the first opening P1 and the edge thereof is convexly curved, and the side of the first buffer zone A adjacent to the heat exchange zone C may be recessed relative to the heat exchange zone C and the edge thereof may be concavely curved. It should be noted that the above-mentioned various shapes of the first buffer zone A and the heat exchange zone C in the above embodiments are merely used to illustrate the shape and arrangement of the heat dissipation fins, and the invention is not limited thereto.

In other embodiments, the heat dissipation fins 500 are not limited to extend in parallel in the first direction D1 and are disposed at intervals in the second direction D2. In the embodiment shown in FIG. 3C, the first opening P1 is disposed on the first side wall 410 and the second opening P2 is disposed on the second side wall 420. The heat dissipation fins 500 distributed between the first opening P1 and the second opening P2 may be curved. In the embodiment, the heat dissipation fins 500 may extend in the first direction D1 and then extend in the second direction D2, and vice versa. The heat dissipation fins 500 may be disposed in parallel and spaced from each other to form a plurality of flow channels between the heat dissipation fins 500. Since the heat dissipation fins 500 can extend in more than one direction, the formed flow channels can also extend in more than one direction. In the embodiment shown in FIG. 3C, the heat dissipation fins 500 are bent at right angles, but not limited thereto. The heat dissipation fins 500 may also be bent smoothly.

Figure 3C:
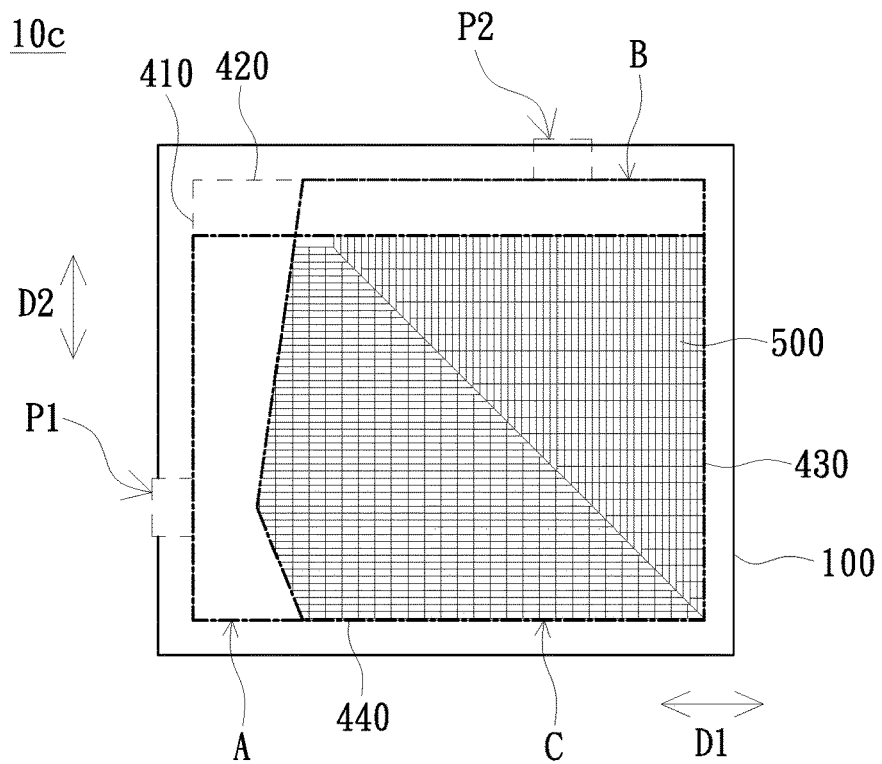

In the embodiment shown in FIG. 3C, the first buffer zone A is surrounded by the first side wall 410, a portion of the second side wall 420, the heat dissipation fins 500 and a portion of the fourth side wall 440, and the second buffer zone B is surrounded by a portion of the second side wall 420, a portion of the third side wall 430 and the heat dissipation fins 500. In the embodiment, the first buffer zone A and the second buffer zone B may partially overlap. Similar to the heat dissipation module 10a shown in FIG. 3A, the heat dissipation fins 500 of the heat dissipation module 10c of the embodiment include a plurality of starting points (not shown) adjacent to the first side wall 410 and a plurality of ending points (not shown) adjacent to the third side wall 430. In this case, the distances between the starting points of the heat dissipation fins 500 and the first side wall 410 gradually change according to the relative position of each of the starting points. For example, the starting point located corresponding to the first opening P1 is closest to the first side wall 410, and the intervals between the first side wall 410 and the side starting points are gradually larger in the first direction D1. In the embodiment, the side of the heat exchange zone C adjacent to the first side wall 410 may protrude toward the first opening P1, and the side of the first buffer zone A adjacent to the heat exchange zone C may be recessed relative to the heat exchange zone C, but the invention is not limited thereto.

In the above embodiment, when the cooling fluid 600 enters the accommodation space S of the heat dissipation module 10 from the first opening P1, the cooling fluid 600 flows through the first opening P1 and then enters the first buffer zone A. Since the heat dissipation fins 500 can be arranged as shown in FIG. 2 for example, the cooling fluid 600 has different flow resistances at different positions of the first buffer zone A. For example, the cooling fluid 600 has a different flow resistance at the center and both sides of the first buffer zone A, and the flow resistance of the cooling fluid 600 at the center is greater than that at both sides. Therefore, the cooling fluid 600 flows from the center to both sides at the first buffer zone A. In other words, the cooling fluid 600 flows to both sides in the first buffer zone A in the second direction D2 before the cooling fluid 600 enters the heat exchange zone C. Therefore, the first buffer zone A can guide the cooling fluid 600 to the heat dissipation fins 500 on both sides to effectively utilize the heat dissipation fins 500 in the heat exchange zone C, thereby contributing to improve the heat exchange efficiency, speed up heat extraction and maintain a proper temperature of the working environment of the device. It should be noted that in the embodiment shown in FIG. 2, the central position and the two side positions of the first buffer zone A are related to the second direction D2, that is, the central position and the two side positions of the first buffer zone A respectively refer to the position at the center of the first buffer zone A and the positions on both sides of the center position in the second direction D2. However, it should be noted that the relative positions of the zones are only used to illustrate the purpose of the invention, and the invention is not limited thereto.

Figure 4:
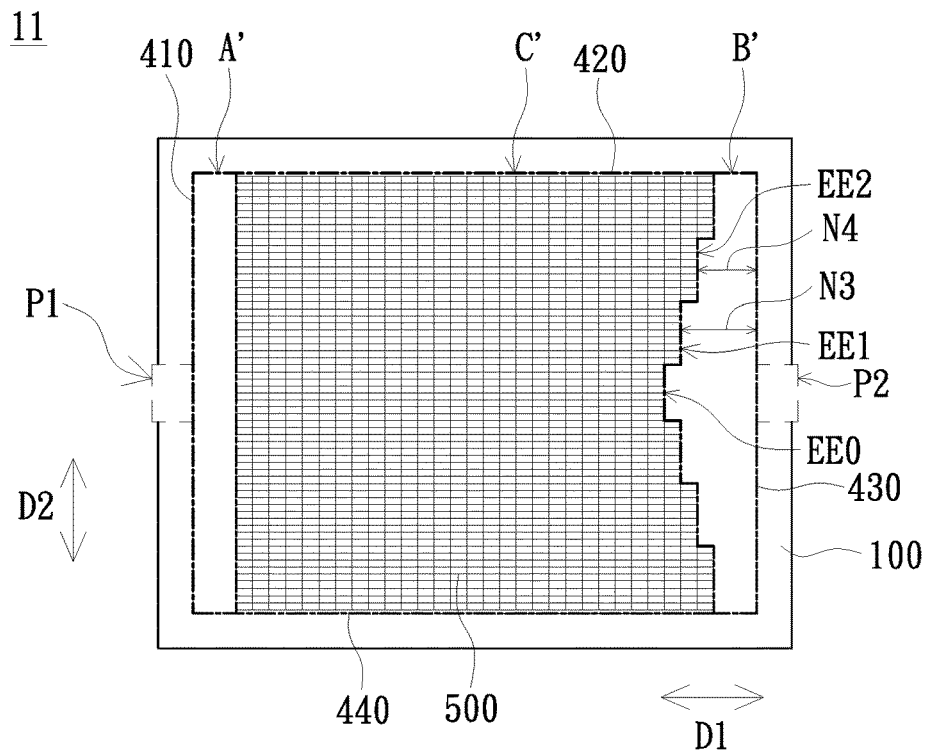
FIG. 4 is a schematic partial top view of a heat dissipation module according to another embodiment of the invention.

In another embodiment, the distances between the heat dissipation fins 500 and the third side wall 430 may be different. In the heat dissipation module 11 as shown in FIG. 4, the first opening P1 is disposed on the first side wall 410 and the second opening P2 is disposed on the third side wall 430. The distances between the heat dissipation fins 500 and the third side wall 430 in the first direction D1 are different. For example, the distances N3 and N4 are different. In the embodiment, the heat dissipation fins 500 in the first direction D1 may have a plurality of ending points (e.g., ending points EE0, EE1 and EE2) adjacent to the third side wall 430. The distances between the ending points and the third side wall 430 may gradually change according to the relative position of each ending point. Specifically, the ending points of the heat dissipation fins 500 include an ending point EE0 farthest from the second opening P2 and other ending points (e.g., ending points EE1 and EE2) respectively located on both sides of the ending point EE0. For example, the ending point EE1 is closer to the ending point EE0 than the ending point EE2 in the second direction D2, and the ending point EE1 is farther from the third side wall 430 than the ending point EE2. That is, the distance N3 is greater than the distance N4. Therefore, the shape of the heat exchange zone C' formed by the heat dissipation fins 500 may be recessed with respect to the second opening P2 at a position corresponding to the second opening P2 on a side adjacent to the third side wall 430.

In the embodiment shown in FIG. 4, the second opening P2 is located at the center position of the third side wall 430. The difference between the heat dissipation module 11 of the embodiment and the foregoing embodiment is also the buffer zone and the heat exchange zone in the accommodation space S. As shown in FIG. 4, the accommodation space S includes a first buffer zone A', a second buffer zone B' and a heat exchange zone C'. In the embodiment, the first buffer zone A' may be surrounded by at least the first side wall 410, a portion of the second side wall 420, the heat dissipation fins 500 and a portion of the fourth side wall 440. In the embodiment shown in FIG. 4, the first buffer zone A' is rectangular. The second buffer zone B' may be surrounded by at least the heat dissipation fins 500, a portion of the second side wall 420, the third side wall 430 and a portion of the fourth side wall 440.

In some embodiments, as described above, the distances between the ending points of the heat dissipation fins 500 and the third side wall 430 may gradually change according to the relative position of each of the ending points. For example, relative to the ending point EE0, the other ending points (e.g., ending points EE1 and EE2) may be arranged in a step. That is, among the ending points, the ending point farther away from the ending point EE0 has the shorter distance from the third side wall 430. Therefore, the shape of the heat exchange zone C' formed by the heat dissipation fins 500 on a side adjacent to the third side wall 430 may be recessed with respect to the second opening P2 at a position corresponding to the second opening P2.

In the embodiment shown in FIG. 4, the second opening P2 may be located at a center position of the third side wall 430. In this case, the second opening P2 may be located corresponding to the center line of the third side wall 430. The ending point EE0 is located corresponding to the second opening P2. In addition, as described above, the ending point EE0 is farthest from the third side wall 430, compared to other ending points EE1 and EE2. The side ending points EE1 and EE2 are gradually arranged away from the ending point EE0 in the second direction D2, and the intervals between the first side wall 410 and the ending points EE1 and EE2 are gradually smaller in the first direction D1. In this case, the side of the heat exchange zone C' adjacent to the third side wall 430 may be concavely tapered, and the side of the second buffer zone B' adjacent to the heat exchange zone C' may protrude from the heat exchange zone C'. The edges of the heat exchange zone C' and the second buffer zone B' may be stepped at the position where the heat exchange zone C' and the second buffer zone B' are connected.

Figure 5A:
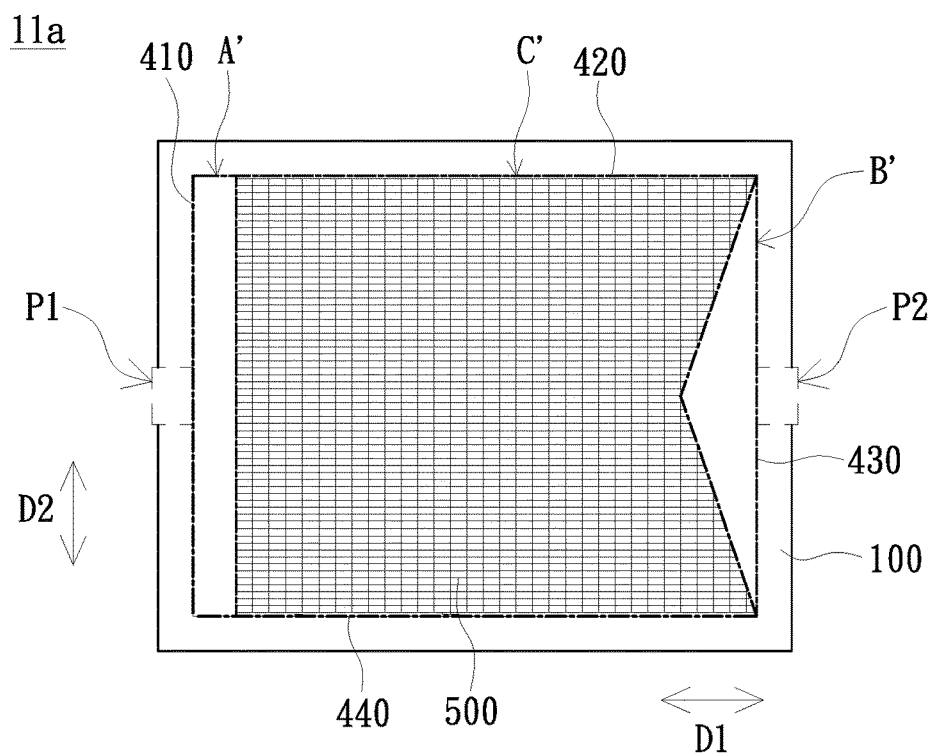
FIGS. 5A to 5C are schematic partial top views of a heat dissipation module according to still another embodiment of the invention.
Figure 5B:
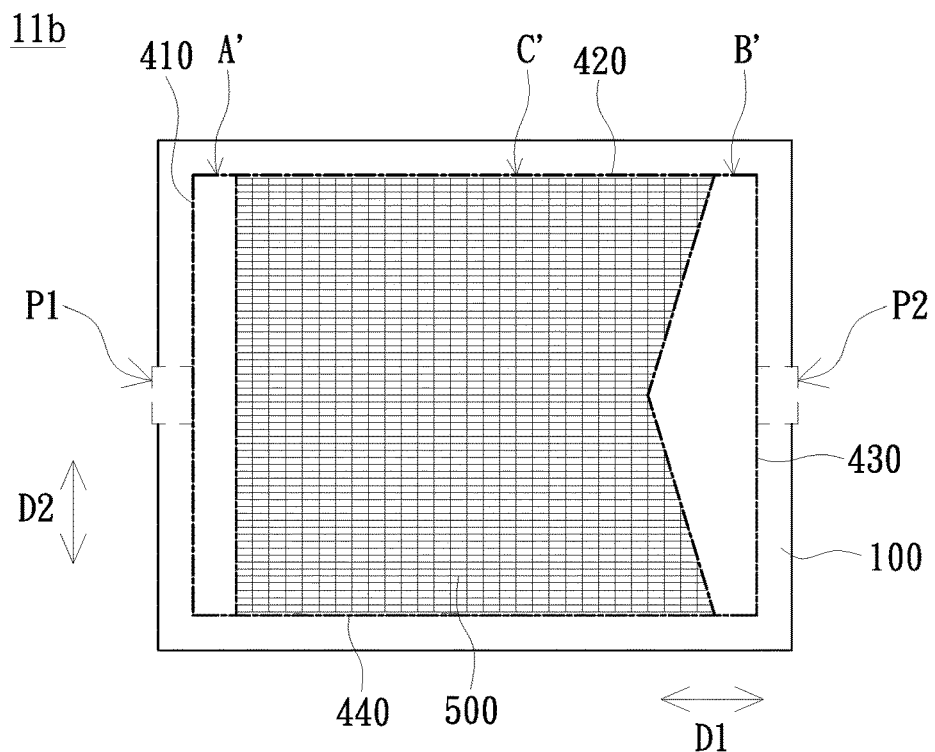
Figure 5C:
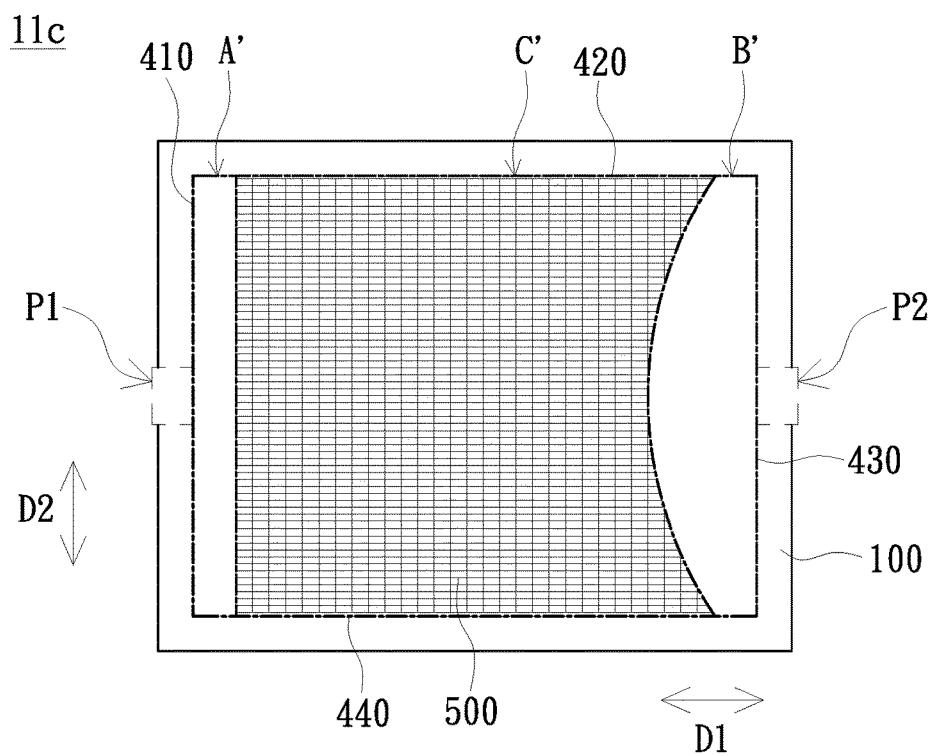

In some embodiments, the edge of the heat exchange zone C' or the second buffer zone B' is not limited to a step shape. In the embodiment shown in FIG. 5A, the side of the heat exchange zone C' of the heat dissipation module 11 adjacent to the third side wall 430 has a concave tapered edge and the edge is smooth, and the side of the second buffer zone B' adjacent to heat exchange zone C' may be convex with respect to the heat exchange zone C' and the edge thereof is smooth. The second buffer zone B' may be substantially triangular, or a combination of a triangle and a rectangle. In the embodiment shown in FIG. 5B, the heat dissipation module 11b is similar to the heat dissipation module 11a, except that the second buffer zone B' of the heat dissipation module 11b may be substantially pentagonal. In the embodiment shown in FIG. 5C, the side of the heat exchange zone C' of the heat dissipation module 11c adjacent to the third side wall 430 is concavely curved, and the side of the second buffer zone B' adjacent to the heat exchange zone C' may be convexly curved. In other embodiments, the second buffer zone B' may also be semi-circular, semi-elliptical, or arched, but the invention is not limited thereto.

In the above embodiment, when the cooling fluid 600 passes through the heat exchange zone C', since the heat dissipation fins 500 in the heat exchange zone C' may be arranged as shown in FIG. 4 for example, the cooling fluid 600 has different flow resistances at different positions of the second buffer zone B'. For example, the cooling fluid 600 has a different flow resistance at the center and both sides of the second buffer zone B', and the flow resistance of the cooling fluid 600 at the center is smaller than that at both sides. Therefore, the cooling fluid 600 flows from the both sides to the center at the second buffer zone B'. In other words, the cooling fluid 600 flows to the center in the second direction D2 in the second buffer zone B' after the cooling fluid 600 enters the second buffer zone B'. Therefore, the second buffer zone B' can guide the cooling fluid 600 to the second opening P2 at the center position, thereby contributing to speed up heat extraction and maintain a proper temperature of the working environment of the device. It should be noted that in the embodiment shown in FIG. 4, the central position and the two side positions of the second buffer zone B' are related to the second direction D2, that is, the central position and the two side positions of the second buffer zone B' respectively refer to the position at the center of the second buffer zone B' and the positions on both sides of the center position in the second direction D2. However, it should be noted that the relative positions of the zones are only used to illustrate the purpose of the invention, and the invention is not limited thereto.

In another embodiment, the distances between the heat dissipation fins 500 and the first side wall 410 in the first direction D1 are different, and the distances between the heat dissipation fins 500 and the third side wall 430 in the first direction D1 are also different. In the embodiment shown in FIG. 6, the accommodation space S includes a first buffer zone A, a second buffer zone B' and a heat exchange zone C''. The first buffer zone A of the heat dissipation module 12 is similar to the first buffer zone A of the heat dissipation module 10 of the embodiment shown in FIG. 2, and the second buffer zone B' is similar to the second buffer zone B' of the heat dissipation module 11 of the embodiment shown in FIG. 4. In the embodiment shown in FIG. 6, the distances between the starting ends and the ending ends of the heat dissipation fins 500 are different from the first side wall 410 and the second side wall 430, respectively. For related technical features, reference may be made to the foregoing embodiments, and no redundant detail is to be given herein.

Figure 6:
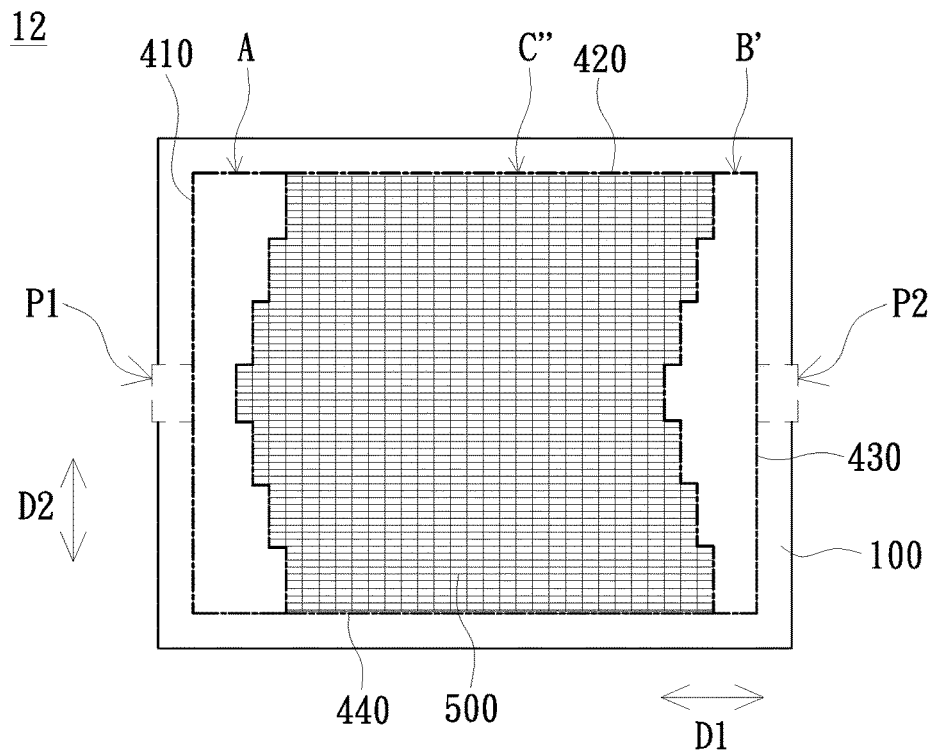
FIG. 6 is a schematic top view of a heat dissipation module according to still another embodiment of the invention.

In the above embodiment as shown in FIG. 6, the first opening P1 is located at the center position of the first side wall 410, and the second opening P2 is located at the center position of the third side wall 430. The cooling fluid 600 flows from the center of the first buffer zone A to both sides after the cooling fluid 600 enters the first buffer zone A through the first opening P1. The cooling fluid 600 to flows to the both sides in the first buffer zone A in the second direction D2. Therefore, the first buffer zone A can guide the cooling fluid 600 to the heat dissipation fins 500 on both sides. When the cooling fluid 600 reaches the second buffer zone B' after passing through the heat exchange zone C'', the cooling fluid 600 is easy to flow to the center with a small flow resistance. The cooling fluid 600 flows toward the center of the second buffer zone B' in second direction D2. Therefore, the second buffer zone B' can guide the cooling fluid 600 to the second opening P2 at the center. Therefore, in the embodiment, by setting the first buffer zone A, the heat exchange zone C'' and the second buffer zone B', the heat exchange zone C'' can be effectively used, the heat exchange efficiency can be improved, the heat extraction can be accelerated and the proper temperature of the operating environment of the device is maintained.

Figure 7A:
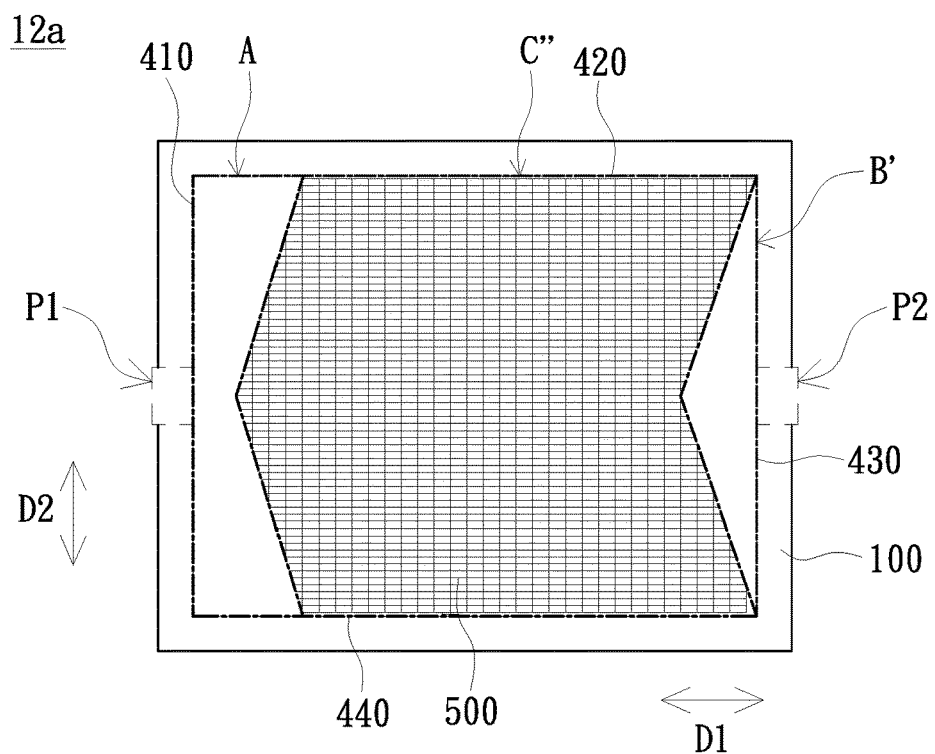
FIGS. 7A to 7B are schematic partial top views of a heat dissipation module according to still another embodiment of the invention.
Figure 7B:
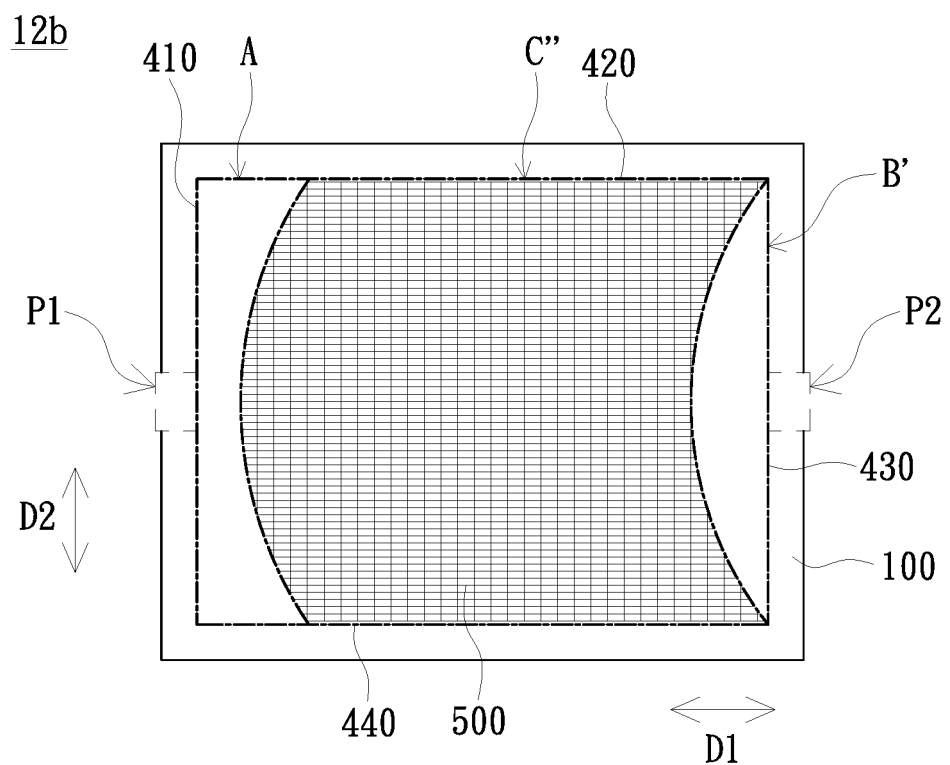

In some embodiments, the edges of the first buffer zone A, the second buffer zone B' or the heat exchange zone C'' are not limited to a step shape. In the embodiment as shown in FIGS. 7A to 7B, the accommodation space S includes a first buffer zone A, a second buffer zone B' and a heat exchange zone C''. In the embodiment shown in FIG. 7A, the first buffer zone A of the heat dissipation module 12a is similar to the first buffer zone A of the heat dissipation module 10a in the embodiment shown in FIG. 3A, and the second buffer zone B' is similar the second buffer zone B' of the heat dissipation module 11b of the embodiment shown in FIG. 5A. In the embodiment shown in FIG. 7B, the first buffer zone A of the heat dissipation module 12b is similar to the first buffer zone A of the heat dissipation module 10b in the embodiment shown in FIG. 3B, and the second buffer zone B' is similar to the second buffer zone B' of the heat dissipation module 11c of the embodiment shown in FIG. 5C. In the embodiment shown in FIGS. 7A to 7B, the distances between the starting ends and the ending ends of the heat dissipation fins 500 are different from the first side wall 410 and the second side wall 430, respectively. For related technical features, reference may be made to the foregoing embodiments, and no redundant detail is to be given herein.

Figure 8A:
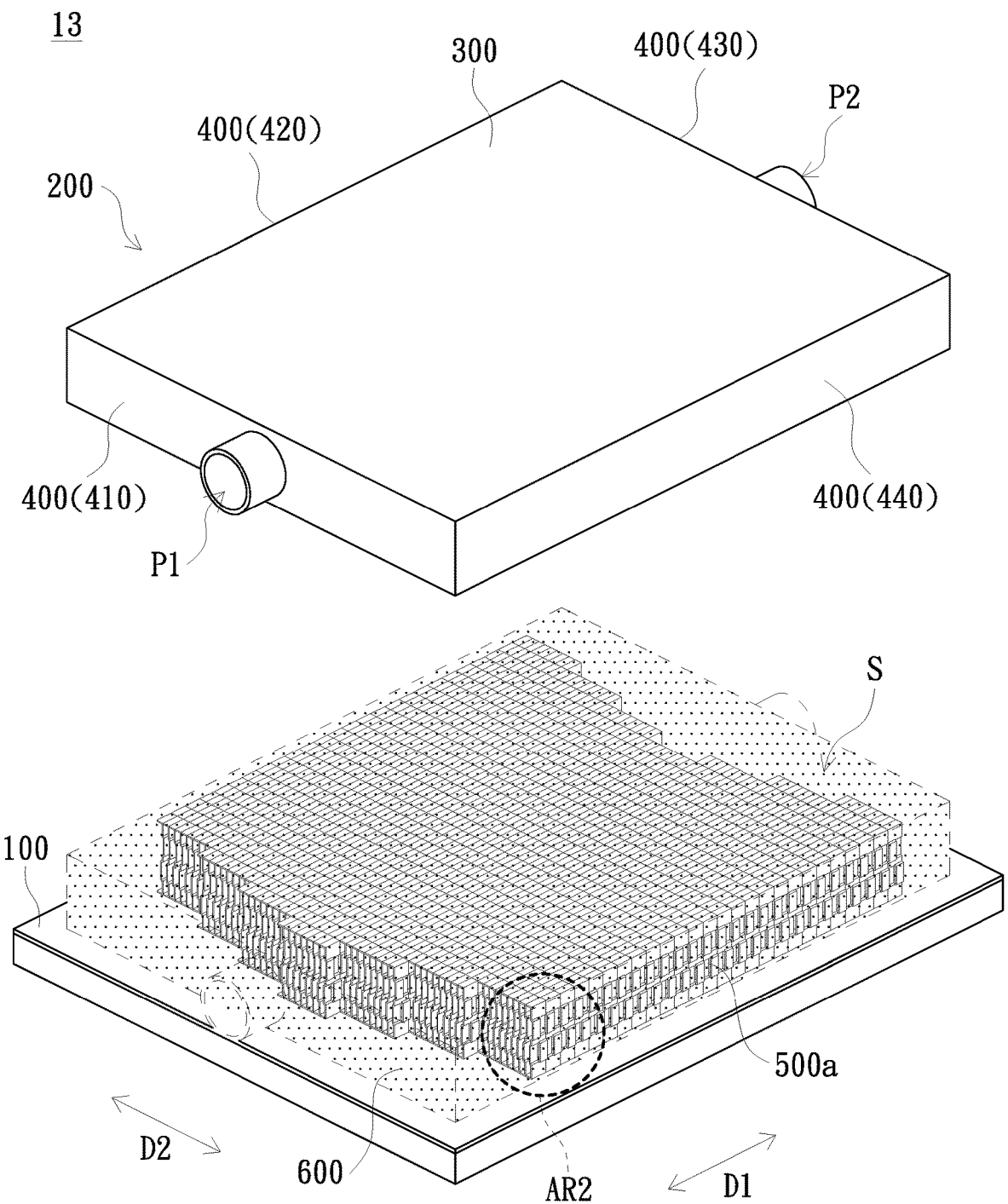
FIG. 8A is a schematic partially exploded view of a heat dissipation module according to another embodiment of the invention.
Figure 8B:
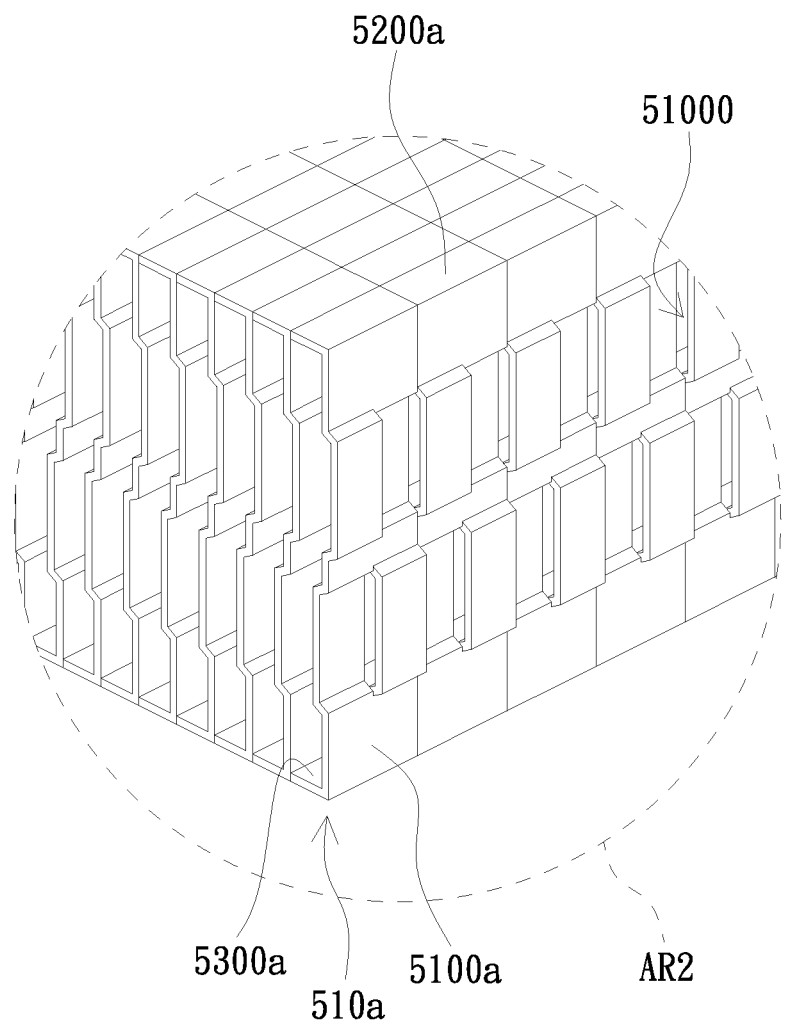
FIG. 8B is a schematic enlarged view of the circle AR2 in FIG. 1A.

FIGS. 8A to 8B show another embodiment of the invention. As shown in FIGS. 8A to 8B, the heat dissipation module 13 includes a base 100, a cover 200 and a plurality of heat dissipation fins 500a. The main difference between the heat dissipation module 13 and the foregoing embodiment is the heat dissipation fin 500a. FIG. 8B is a schematic enlarged view of the circle AR2 in FIG. 8A. As shown in FIG. 8B, the body of the heat dissipation fin 500a is provided with a plurality of holes 51000. Each of the heat dissipation fins 500a may be formed by a plurality of fin units 510a. The fin unit 510a may include a body portion 5100a, a first bent portion 5200a and a second bent portion 5300a that are bent with respect to the body portion 5100a. The main difference between the fin unit 510a and the fin unit 510 is that the body portion 5100a is provided with the holes 51000, so that the flow channels can communicate with each other, thereby increasing the flow path of the cooling fluid 600.

Figure 9:
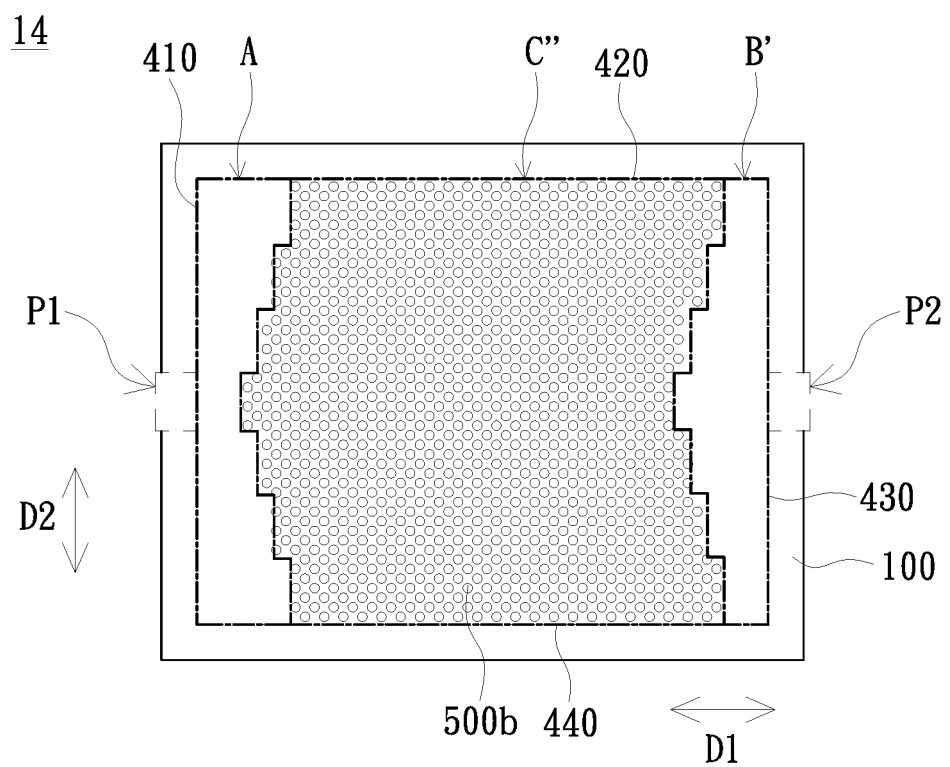
FIG. 9 is a schematic partial top view of a heat dissipation module according to still another embodiment of the invention.

In some embodiments, FIG. 9 is a schematic partial top view of a heat dissipation module according to still another embodiment of the invention. The heat dissipation module 14 shown in FIG. 9 includes a base 100, a cover 200 (not shown) and a plurality of heat dissipation fins 500b. The main difference between the heat dissipation module 14 and the foregoing embodiment is the heat dissipation fins 500b. The heat dissipation fins 500b have a columnar structure, the heat dissipation fins 500b are spaced from each other and extending along a direction perpendicular to the first direction D1 and the second direction D2 in the accommodation space S. The distances between the heat dissipation fins 500b and the first side wall 410 and the third side wall 430 in the first direction D1 are different to constitute a heat exchange zone C'' and a first buffer zone A and a second buffer zone B' respectively on the both sides of the heat exchange zone C''. Please refer to the related description of the heat dissipation module 12 for details. The heat dissipation fins 500b spaced from each other constitute a plurality of flow channels.

Figure 10:
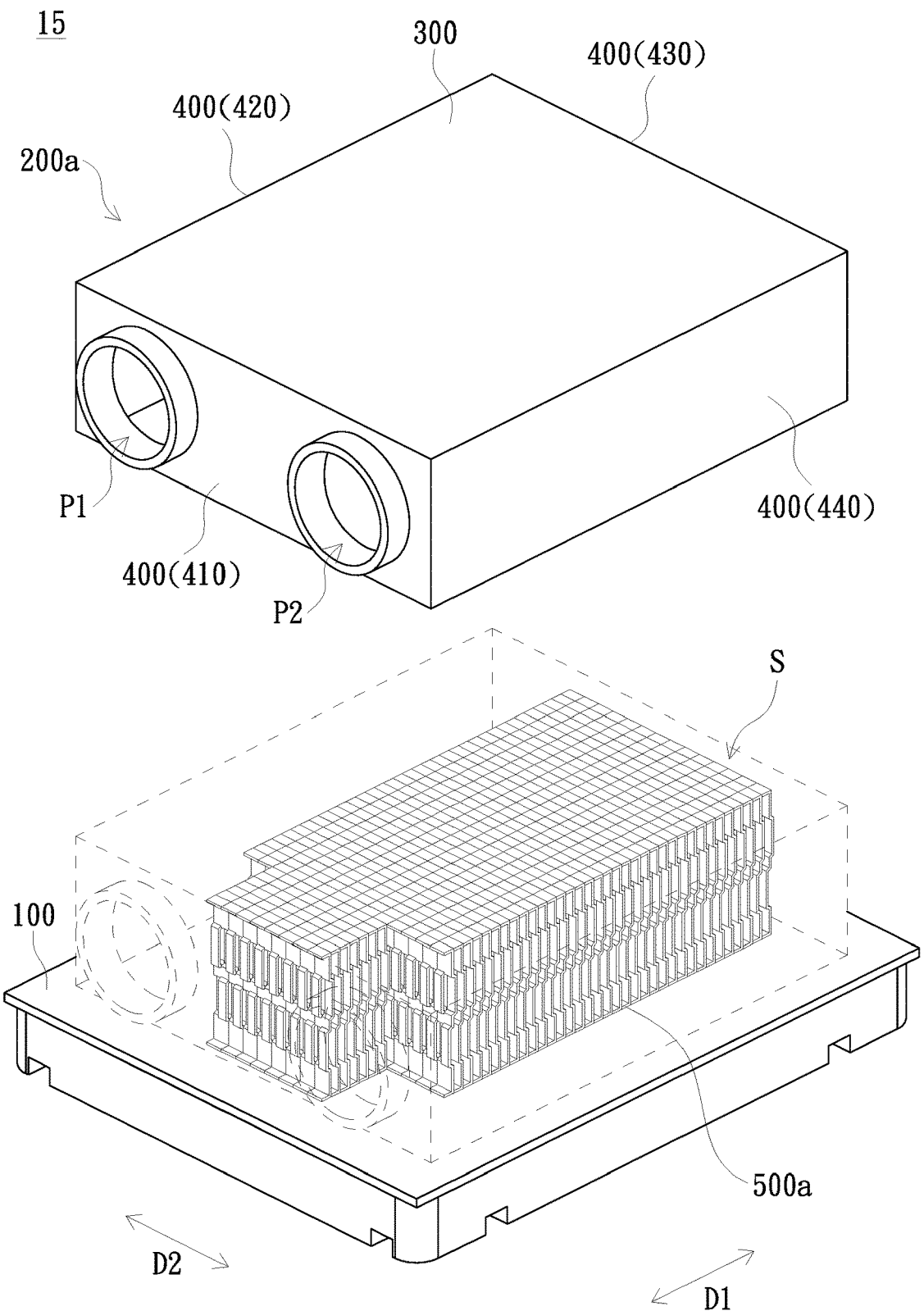
FIG. 10 is a schematic partially exploded view of a heat dissipation module according to still another embodiment of the invention.
Figure 11:
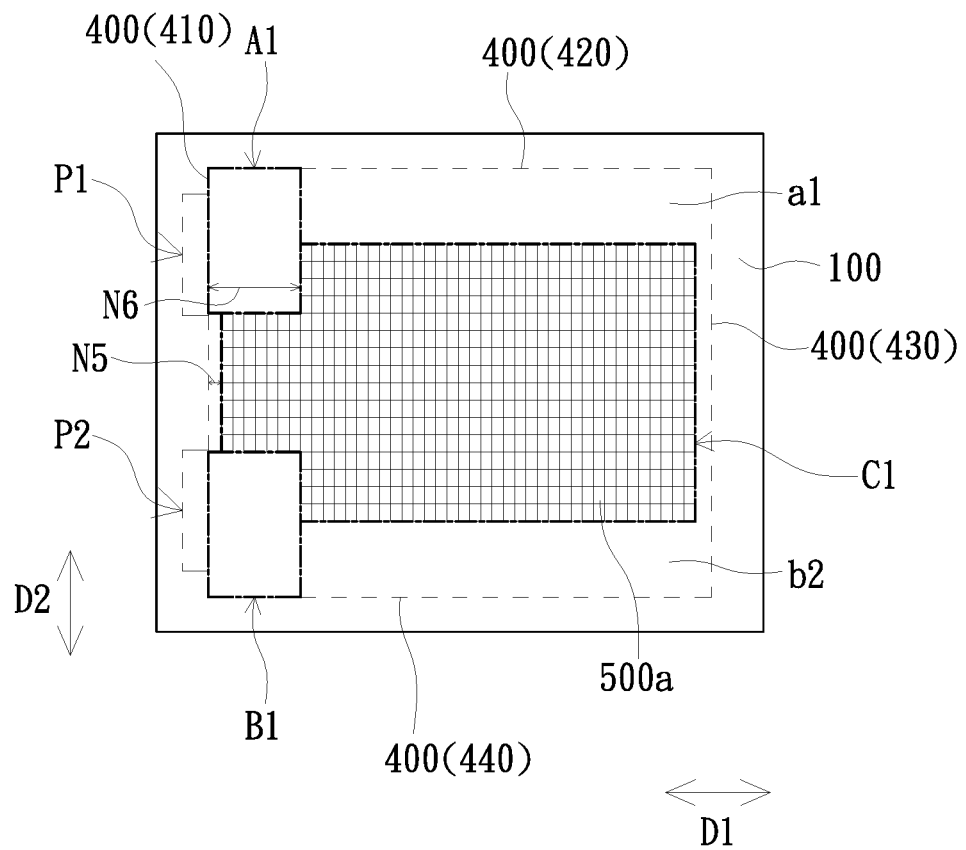
FIG. 11 is a schematic partial top view of the heat dissipation module of the embodiment shown in FIG. 10.

In some embodiments, FIGS. 10 to 11 show yet still another embodiment of the invention. As shown in FIGS. 10 to 11, the main difference between the heat dissipation module 15 and the foregoing embodiment is that the first opening P1 and the second opening P2 are both disposed on the first side wall 410 and are respectively located at two ends of the first side wall 410. Each of the heat dissipation fins 500a may extend substantially in the second direction D2 in the accommodation space S, and the plurality of the heat dissipation fins 500a may extend parallel to each other and be disposed at intervals in the first direction D1. The heat dissipation fins 500a constitute a plurality of flow channels extending in the second direction D2. The heat dissipation fins 500a can also be replaced by heat dissipation fins 500 or 500b. As in the foregoing embodiment, the distances between the heat dissipation fins 500a and the first side wall 410 in the first direction D1 are different.

In the embodiment, the distances between the heat dissipation fins 500a and the first side wall 410 in the first direction D1 are different. Specifically, at a position corresponding to the first opening P1 and the second opening P2, the distance N6 between the heat dissipation fin 500a and the first side wall 410 in the first direction D1 is relatively large. At other positions corresponding to the first side wall 410 (e.g., at a position between the first opening P1 and the second opening P2), the distance N5 between the heat dissipation fin 500a and the first side wall 410 in the first direction D1 is relatively small. That is, the distance N6 is greater than the distance N5.

In the embodiment shown in FIG. 11, the first buffer zone A1 of the heat dissipation module 15 is surrounded by a portion of the first side wall 410, a portion of the second side wall 420 and the heat dissipation fins 500a, and the first opening P1 is in communication with the first buffer zone A1. The second buffer zone B1 is surrounded by a portion of the first side wall 410, the heat dissipation fins 500a and a portion of the fourth side wall 440, and the second opening P2 is in communication with the second buffer zone B1. In the embodiment, the first buffer zone A1 and/or the second buffer zone B1 may be rectangular or square.

In the embodiment shown in FIG. 11, the accommodation space of the heat dissipation module 15 may further include a first main flow channel a1 and a second main flow channel b2. The first main flow channel a1 is surrounded by at least the second side wall 420, a portion of the third side wall 430 and the heat dissipation fins 500a. The second main flow channel b2 is surrounded by at least the heat dissipation fins 500a, a portion of the third side wall 430 and the fourth side wall 440. The flow channels formed by the heat dissipation fins 500a are perpendicular to the first main flow channel a1 or the second main flow channel b2, and the flow channels formed by the heat dissipation fins 500a are in communication with the first main flow channel a1 and the second main flow channel b2. In some embodiments, the first main flow channel a1 and the second main flow channel b2 are respectively located on opposite sides of the heat dissipation fins 500a and are adjacent to the second side wall 420 and the fourth side wall 440. When the cooling fluid 600 enters the first buffer zone A1 through the first opening P1, since the distance between the heat dissipation fins 500a and the first side wall 410 is relatively large at the first buffer zone A1, the cooling fluid 600 in the first buffer zone A1 has a lower flow resistance in the second direction D2 to guide the cooling fluid 600 in the first buffer zone A1 to flow quickly into the first main flow channel a1 in the second direction D2. Then, the cooling fluid 600 enters the flow channels (that is, enters the heat exchange zone C1) constituted by the heat dissipation fins 500a through the first main flow channel a1. When the cooling fluid 600 leaves the heat exchange zone C1, the cooling fluid 600 flows to the second buffer zone B1 via the second main flow channel b2. Since the distance between the heat dissipation fin 500a and the first side wall 410 is relatively large at the second buffer zone B1, the cooling fluid 600 enters the second buffer zone B1 in the second direction D2, and then the cooling fluid 600 flows quickly to the second opening P2 via the second buffer zone B1. Therefore, in the embodiment, the first buffer zone A1, the heat exchange zone C1 and the second buffer zone B1 are used to improve the heat exchange efficiency and speed up the heat extraction, thereby maintaining an appropriate temperature of the working environment of the device.

Figure 12:
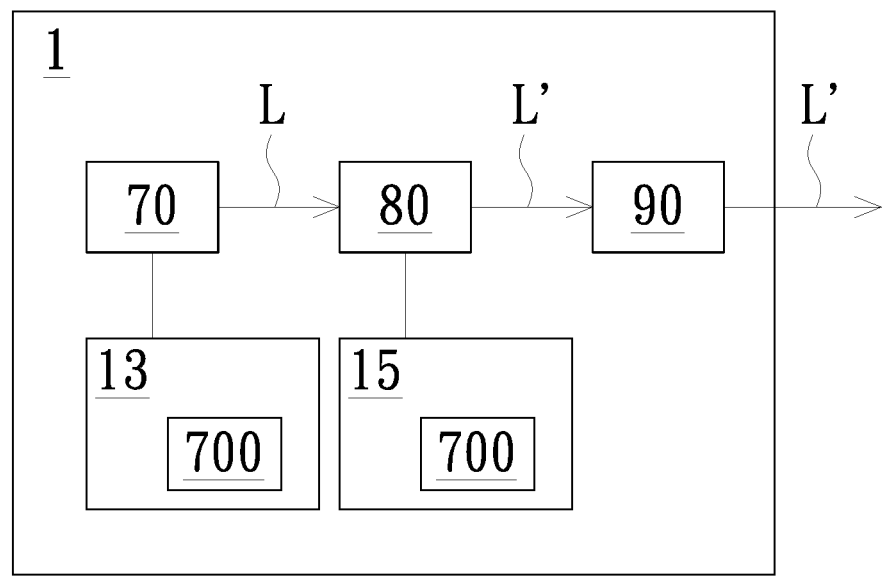
FIG. 12 is a functional block view of a projection apparatus according to an embodiment of the invention.

In some embodiments, the invention further provides a projection apparatus 1. FIG. 12 is a functional block view of a projection apparatus according to an embodiment of the invention, in which a schematic path of a beam transmission in the projection apparatus 1 is shown. The projection apparatus 1 includes a light source module 70, a light valve 80, a projection lens 90 and at least one of the heat dissipation modules 13 and 15. However, any of the aforementioned heat dissipation modules can also be used here. The light source module 70 uses a laser light source or a light emitting diode light source, but is not limited thereto. The light source module 70 is used to provide an illumination beam L. The light valve 80 is located on the transmission path of the illumination beam L and is used to convert the illumination beam L into an image beam L'. The light valve 80 may be a transmissive light valve or a reflective light valve. The transmissive light valve may be a transmissive liquid crystal panel, and the reflective light valve may be a digital micro-mirror device (DMD) or a liquid crystal on silicon (LCOS) panel, but it is not limited thereto. The heat dissipation modules 13 and 15 are disposed adjacent to at least one of the light source module 70 and the light valve 80. In the embodiment, the heat dissipation modules 13 and 15 are respectively disposed adjacent to the light source module 70 and the light valve 80 to dissipate heat and maintain the light source module 70 and/or the light valve 80 at an appropriate temperature. The projection lens 90 is located on a transmission path of the image beam L' and is used to project the image beam L' to form a frame on a wall surface, for example.

In some embodiments, the projection apparatus 1 may further include a circulation system 700 for circulating the cooling fluid 600 described above. For example, the cooling fluid 600 may be water. The circulation system 700 may be used to pump the cooling fluid 600 to flow from the first opening P1 to the second opening P2 of the heat dissipation module 13 and/or from the first opening P1 to the second opening P2 of the heat dissipation module 14, and vice versa. The circulation system 700 may include, for example, a pump and a radiant cooling plate. The power or operating time of the circulation system 700 can be adjusted according to, for example, the flow rate requirement and the operating conditions of the light source module 70 or the light valve 80.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first opening, the second opening, the first direction, the second direction, the first bending portion, the second bending portion, the first side wall, the second side wall, the first buffer zone and the second buffer zone are only used for distinguishing various elements and do not limit the number of the elements.

What is claimed is:

1. A heat dissipation module, comprising a base, a cover and a plurality of heat dissipation fins, wherein:
   the cover is disposed on the base and forms an accommodation space with the base; and
   the plurality of heat dissipation fins is disposed in the accommodation space,
   wherein the cover comprises a top, at least one side wall, a first opening and a second opening, and the at least one side wall surrounds the top and is connected to the base, the at least one side wall comprises a first side wall, a second side wall, a third side wall and a fourth side wall sequentially connected end to end, the first side wall and the third side wall are respectively located on opposite sides of the plurality of heat dissipation fins,
   wherein distances between the plurality of heat dissipation fins and the first side wall in a first direction are different and/or distances between the plurality of heat dissipation fins and the third side wall in the first direction are different,
   wherein the accommodation space comprises a first buffer zone adjacent to the first opening, a second buffer zone adjacent to the second opening, and a heat exchange zone located between the first buffer zone and the second buffer zone, wherein the plurality of heat dissipation fins are distributed in the heat exchange zone;
   wherein the first opening and the second opening are respectively disposed on the first side wall and the third side wall, the first buffer zone is surrounded by at least the first side wall and the plurality of heat dissipation fins, and the second buffer zone is surrounded by at least the plurality of heat dissipation fins and the third side wall.

2. The heat dissipation module according to claim 1, wherein the second buffer zone is rectangular, triangular, semi-circular, semi-elliptical, arched, pentagonal, or a combination thereof.

3. The heat dissipation module according to claim 1, wherein the first buffer zone is adjacent to the heat exchange zone, a side of the first buffer zone adjacent to the heat exchange zone is recessed toward the first opening, and the side of the first buffer zone is concavely curved.

4. The heat dissipation module according to claim 3, wherein the first buffer zone is a concave pentagon.

5. The heat dissipation module according to claim 1, wherein the first opening is located at a center position of the first side wall, and the second opening is located at a center position of the third side wall.

6. The heat dissipation module according to claim 1, wherein the plurality of heat dissipation fins extend parallel to each other in the accommodation space in the first direction and are disposed at intervals in a second direction, wherein the second direction is perpendicular to the first direction.

7. The heat dissipation module according to claim 1, further comprising a cooling fluid, wherein the cooling fluid flows through the first opening, the accommodation space and the second opening, and flows between the plurality of heat dissipation fins.

8. The heat dissipation module according to claim 1, wherein the plurality of heat dissipation fins comprises a plurality of sheet-shaped fins, a plurality of offset strip fins or a plurality of columnar fins.

9. A heat dissipation module, comprising a base, a cover and a plurality of heat dissipation fins, wherein:
   the cover is disposed on the base and forms an accommodation space with the base; and
   the plurality of heat dissipation fins is disposed in the accommodation space, wherein the cover comprises a top, at least one side wall, a first opening and a second opening, and the at least one side wall surrounds the top and is connected to the base, the at least one side wall comprises a first side wall, a second side wall, a third side wall and a fourth side wall sequentially connected end to end, the first side wall and the third side wall are respectively located on opposite sides of the plurality of heat dissipation fins, wherein distances between the plurality of heat dissipation fins and the first side wall in a first direction are different and/or distances between the plurality of heat dissipation fins and the third side wall in the first direction are different, wherein the accommodation space comprises a first buffer zone adjacent to the first opening, a second buffer zone adjacent to the second opening, and a heat exchange zone located between the first buffer zone and the second buffer zone, wherein the plurality of heat dissipation fins are distributed in the heat exchange zone;

wherein the first opening and the second opening are disposed on the first side wall, the first buffer zone is surrounded by at least a portion of the first side wall, a portion of the second side wall and the plurality of heat dissipation fins, and the second buffer zone is surrounded by at least a portion of the first side wall, the plurality of heat dissipation fins and a portion of the fourth side wall, wherein the first opening is in communication with the first buffer zone.

10. The heat dissipation module according to claim 9, wherein the first buffer zone or the second buffer zone is a rectangle or a square, respectively.

11. The heat dissipation module according to claim 9, wherein the first opening and the second opening are located at two ends of the first side wall, respectively.

12. The heat dissipation module according to claim 9, wherein the plurality of heat dissipation fins extend parallel to each other in the accommodation space in a second direction and are disposed at intervals in the first direction, wherein the second direction is perpendicular to the first direction.

13. A projection apparatus, comprising a light source module, a light valve, a heat dissipation module and a projection lens, wherein:
the light source module is used to provide an illumination beam;
the light valve is located on a transmission path of the illumination beam and is used to convert the illumination beam into an image beam;
the heat dissipation module is disposed adjacent to at least one of the light source module and the light valve;
the heat dissipation module comprises a base, a cover and a plurality of heat dissipation fins, wherein:
the cover is disposed on the base and forms an accommodation space with the base; and
the plurality of heat dissipation fins is disposed in the accommodation space,
wherein the cover comprises a top, at least one side wall, a first opening and a second opening, and the at least one side wall surrounds the top and is connected to the base, the at least one side wall comprises a first side wall, a second side wall, a third side wall and a fourth side wall sequentially connected end to end, the first side wall and the third side wall are respectively located on opposite sides of the plurality of heat dissipation fins,
wherein distances between the plurality of heat dissipation fins and the first side wall in a first direction are different and/or distances between the plurality of heat dissipation fins and the third side wall in the first direction are different,
wherein the accommodation space comprises a first buffer zone adjacent to the first opening, a second buffer zone adjacent to the second opening, and a heat exchange zone located between the first buffer zone and the second buffer zone, wherein the plurality of heat dissipation fins are distributed in the heat exchange zone;
wherein the first opening and the second opening are respectively disposed on the first side wall and the third side wall, the first buffer zone is surrounded by at least the first side wall and the plurality of heat dissipation fins, and the second buffer zone is surrounded by at least the plurality of heat dissipation fins and the third side wall; and
the projection lens is located on a transmission path of the image beam and is used to project the image beam.

14. The projection apparatus according to claim 13, wherein the heat dissipation module further comprises a cooling fluid, the cooling fluid flows through the first opening, the accommodation space and the second opening, and flows between the plurality of heat dissipation fins.

15. The projection apparatus according to claim 13, further comprising a circulation system, wherein the circulation system pumps the cooling fluid to flow from the first opening to the second opening.

* * * * *